April 24, 1951     L. L. BOSCH     2,549,754
MAGNETIC SPEED RESPONSIVE DEVICE
Filed March 19, 1946     2 Sheets-Sheet 1
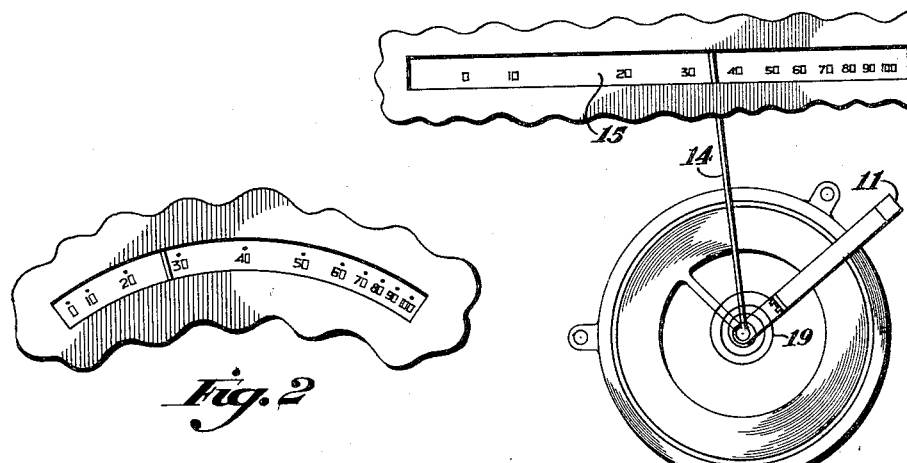
Fig. 1
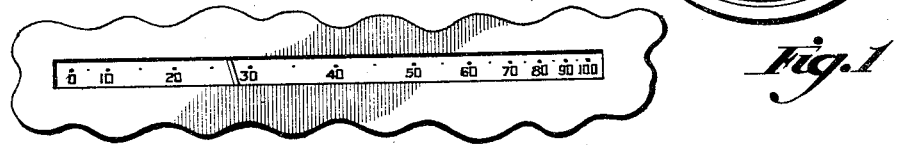
Fig. 2
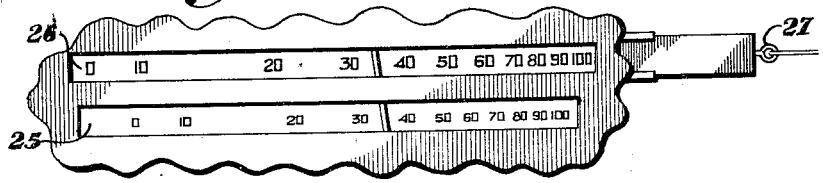
Fig. 3
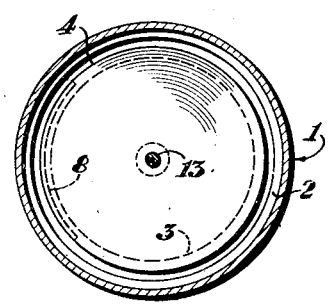
Fig. 4
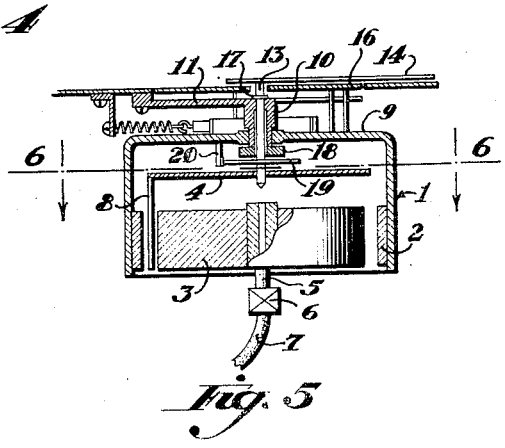
Fig. 5
Fig. 6
INVENTOR.
Lester L. Bosch
BY
Wood, Arey, Herron & Evans
Attorneys

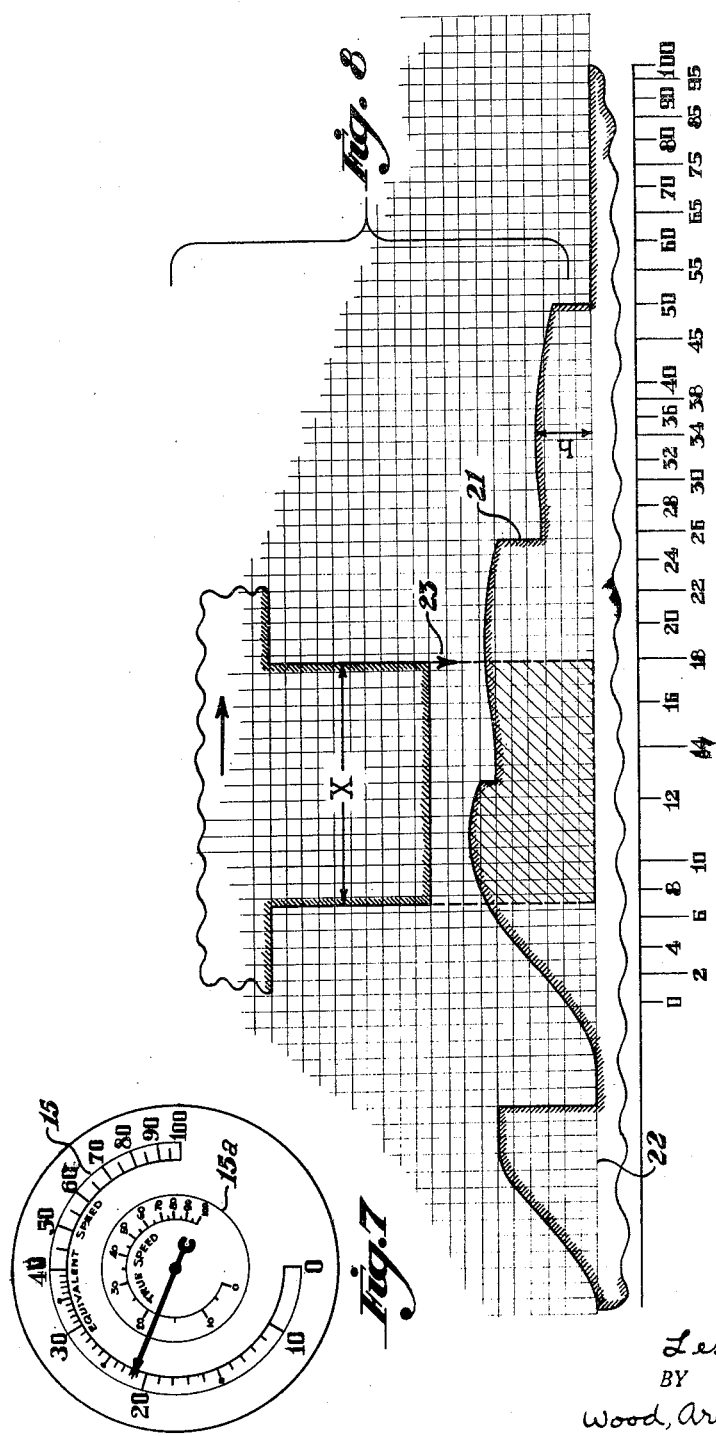

Patented Apr. 24, 1951

2,549,754

UNITED STATES PATENT OFFICE 2,549,754

MAGNETIC SPEED RESPONSIVE DEVICE

Lester L. Bosch, Cincinnati, Ohio

Application March 19, 1946, Serial No. 655,463

8 Claims. (Cl. 264—13)

This invention relates to speed indicating instruments of the induction disc type. The principal purpose of the invention has been to provide improvements whereby the apparatus displays arbitrarily selected scale characteristics rather than scale characteristics limited by the uniform angular displacement of the usual speed responsive element. Inasmuch as these improvements are particularly useful in the construction of speedometers for automobiles or similar vehicles the invention is disclosed in that environment but also may be employed in other types of induction indicators where predetermined characteristics are desired in respect to the deflection of the needle or the pointer.

A typical automobile speedometer of the type in current use comprises a rotatable permanent magnet, a stationary member including a yoke of good magnetic conducting qualities surrounding the path of rotation of the magnet and an induction member which is interposed between the yoke and the path of rotation of the magnet, all three elements being disposed on a common axis. The induction member has a pointer associated with it. By rotation of the permanent magnet eddy currents are induced in the induction member and, by magnetic reaction of these eddy currents with the magnet, the induction member is caused to move from a rest or starting position a distance which will vary in accordance with the speed of rotation of the magnet. In this manner the pointer will move to one position for a given magnet speed, twice the angular distance for a magnet speed twice as great, two and one-half times as far for a magnet speed two and one-half times as great, etc. In other words, the displacement of the needle bears a linear relationship to the speed of rotation of the magnet and therefore bears a linear indicating characteristic with respect to the speed of the vehicle. Such being the case, the unit angular graduations of the indicator and scale all are spaced equidistant from one another.

Thus, the graduations in the scale of a conventional instrument are spaced just as close to one another in the more important 20 to 60 mile per hour range as in the 10 to 20 mile per hour range; in fact, if the typical instrument has a straight scale instead of an arcuately shaped scale, the graduations at the center of the scale (which embodies the usual operating speeds) are actually spaced closer together than the graduations at the very high or very low speeds. Yet it is apparent that a true indication of speed in the 20 to 60 mile per hour range (an indication which is readily discernible at a glance), is highly desirable for safety reasons, and in order that the operator may comply conveniently with speed laws. Not only does this invention provide for the construction of a uniform straight line scale but further a scale which has expanded rather than compressed divisions in the important operating range.

In other words, in the interest of safety, it is desirable that a speedometer be constructed which in all ranges will provide a true speed indication but which will have a scale that relatively is compressed in the low and very high speed ranges, while the scale in the more important average speed range, for instance, 20 to 60 miles per hour relatively will be expanded in order that the speed in such range may be discerned at a glance and without carefully scrutinizing the exact position of the needle with respect to the scale. The provision of a speedometer having such characteristics is one of the chief objectives of this improvement.

On the other hand, the invention provides a convenient and reliable means for constructing a speedometer having indicating characteristics conforming to any predetermining schedule other than the one just discussed, for instance, linearly throughout a portion of the scale, logarithmically throughout the balance of the scale, or in other predetermined order.

A further objective of the invention has been to provide a speedometer which may be used in accordance with the principles of controlling vehicular traffic to promote safety as disclosed in United States Patents No. 2,284,633 and No. 2,362,971, according to which vehicles are declassified and the permissible speeds thereby limited by the operating condition of the vehicle and the safety record of the driver.

Briefly, the invention is predicated upon the concept of controlling the response of the induction member which actuates the needle through relative configuration of the induction member and yoke of the apparatus, or the relating of these elements to each other to obtain the desired result. Otherwise expressed, the yoke is shaped relative to the induction member so that as the induction member is caused to move from its starting point, the reluctance of the magnetic path from one pole of the revolving magnet through the induction member to the yoke and return to the other pole varies so as to cause a prescribed or predetermined number of lines of magnetic force to pass through the induction member. Inasmuch as torque exerted on the induction element varies in accordance with the rate of cutting lines of force, a given speed of rotation of the magnetic element will cause the torque to vary directly with the number of lines of force traversing the disc element. Thus, if an expanded scale section is desired the reluctance of the path is reduced within the outlined area of the yoke corresponding to the expanded scale section, for instance, by adding magnetic conducting material to the yoke at the area thereof corresponding to this scale section, whereby the number of lines of force passing through the induction element is increased while it is in registry with the respective portion of the yoke section. On the other hand, if a compressed scale section is desired the reluctance of the path through the induction element is increased by removing sections of magnetic conducting material of the yoke at the areas thereof corresponding to the position of the induction element within the compressed scale section. The minimum number of lines will, of course, occur with complete removal of yoke and the magnitude of this minimum value will be governed by the strength of the permanent magnet and the position of the induction element relative to the magnet. This addition or removal of magnetic conducting material to or from the yoke readily may be computed or determined empirically. In either event, for any given rate of input to the magnet, the needle may be caused to assume predetermined deflection characteristics.

The induction element in a conventional magnet type speedometer is a cup-shaped member, the annular wall thereof residing between the yoke and the path of rotation of the magnet. In accordance with the present invention the induction element preferably is in the form of a circular plate or shallow cup having one or more portions of the usual annular wall residing intermediate the yoke and path of rotation of the magnet rather than an entire annular wall. In the example chosen in this application a single section or ear may constitute the active element of the induction element. This construction enables the ear, or portions thereof, progressively to be exposed to areas of the yoke which are progressively different from one another according to the deflection characteristics desired as the element is caused to move from its "rest" position. The term "induction member" therefore is used in a functional sense with respect to the yoke rather than in a mechanically descriptive sense throughout this specification and in the claims. It will also be understood that the induction element may assume different shapes other than the ear form, to obtain the result.

From the foregoing principles upon which the invention is predicated and from the following detailed description of the drawings in which typical embodiments of the invention are illustrated, those skilled in the art readily will comprehend the various modifications to which the invention is susceptible.

In the drawings:

Figure 1 is a diagrammatic view illustrating a portion of a speedometer with a needle thereof arranged to sweep past a scale which relatively is compressed in the 60 to 100 position and which relatively is expanded in the 10 to 30 range.

Figure 2 is a partial view similar to Figure 1 showing a scale which is relatively expanded in the 30 to 50 range thereof and otherwise relatively compressed.

Figure 3 is a view of a scale extending longitudinally in a straight rather than in an arcuate line, the divisions thereof being generally similar to the divisions of the scale shown in Figure 2.

Figure 4 is a view showing two scales arranged adjacent one another, one of the scales being relatively shiftable with respect to the other in accordance with the disclosure of United States Patent No. 2,362,971.

Figure 5 is a cross sectional view of a speedometer constructed in accordance with this invention.

Figure 6 is a cross sectional view taken on the line 6—6 of Figure 5.

Figure 7 is a view showing two scales arranged circumferentially with respect to each other, one of the scales being relatively shiftable with respect to the other in accordance with the disclosure in United States Patent No. 2,362,971.

Figure 8 is a diagrammatic view showing a developed view of a yoke constructed to provide pointer deflection characteristics in accordance with a scale of the type shown in Figure 7, that is, a scale which arbitrarily, for illustration purposes, is of a linear nature in the range from zero to 10, greatly expanded in the range from 10 to 30, and compressed in the high speed ranges.

The speedometer shown in Figure 5, into which the improvements of the present invention have been embodied, typically comprises an annular member indicated generally at 1, which at its inner surface, carries a yoke 2 of magnetic material, for instance, soft iron, a permanent magnet member indicated generally at 3, and an induction member indicated generally at 4. The magnet 3 may be of circular or bar shape and it is mounted on an axle 5 journalled in a bearing block 6, the magnet being rotated through a flexible shaft 7 or in other suitable manner at a speed which is equal or proportional to the speed to be indicated. The magnet is on an axis common with that of the yoke 2.

Induction member 4 comprises a cup or plate having an elongated ear 8 bent therefrom to reside adjacent the inner surface of the yoke 2 and beyond, but adjacent, the path of rotation of the magnet 3.

The annular housing 1 from which the yoke 2 is supported may be cup-shaped having its cross walls 9 suitably supported from a hub 10 which is mounted on a bracket 11 or in other suitable manner. The hub 10 is hollow and a pivot shaft 13 passes through it, the inward end of this shaft providing the support for the induction member 4 while the outer end of the shaft carries the pointer 14. Scale 15 of the speedometer is located on panel 16 directly attached to yoke 9 in suitable manner. Shaft 13 has collars 17 and 18 at opposite ends of the hub 10 and the shaft also has one end of a hair spring 19 connected to it, the opposite end of the hair spring being fastened to a post 20 whereby the induction member 4 and the needle are biased to a rest or zero scale position.

As the magnet 3 is rotated, each time one of its poles passes the ear 8 of the induction member 4, lines of force pass through the induction member and an eddy current is generated in the ear of the induction member which causes the induction member to tend to follow the magnet. It is prevented from spinning by hair spring 19. Thus, the induction member comes to rest when the torque created by the induced eddy currents is balanced by the tension of hair spring 19.

As previously explained, the torque upon the induction member established in this manner varies with the area in registry between the ear 8 and the yoke. By varying this area of registry, for instance, by adding or removing magnetic material to or from the yoke 2 at respective portions thereof, the torque at the respective areas may be varied. These variations in the registry area may be accomplished conveniently by configurating one or both edges of the yoke so that it is wide at parts of the face which it presents to the induction member and narrow at other parts according to the torque desired. Such configurations may be determined empirically, that is, shaping the yoke by hand until the speedometer pointer 14 is caused to be deflected to a given point for a given speed of rotation of the magnet 3, or a shape may be computed mathematically and graphically by determining the torque required to deflect the needle to a given point and then determining what area of registry between the yoke and induction member will be required to provide that torque by the cutting lines of magnetic force for a given speed of rotation of the magnet.

A typical computation of this type is reproduced in Figure 8 and in the data which follows:

spective distances shown in column 2, that is, based on an arbitrary figure of 10 for convenience, as the rate of cutting lines of force to deflect the needle from zero to 100, the other values in this column are determined by dividing respective figures in column 2 by 1.17. Column 6 indicates the total flux required through the ear 8 as determined by dividing the respective rates of cutting lines of force (column 5) by the corresponding vehicle speeds in column 1. For convenience the factor 10 is used as a multiplier in each operation. The figure 10 shown in column 7 corresponds to the lines of flux which would pass through the induction element with a complete absence of yoke effect, that is, for maximum reluctance of the magnetic circuit. Column 8 is obtained by subtracting values in column 7 from those in column 6. For each given speed column 8 indicates the flux which must be added by virtue of the presence of the yoke iron in the magnetic path. This value is the same as, or proportional to, the required area of registry between the yoke and induction member for the given speeds.

The shape of the yoke is developed from these

| 1 | 2 | 3 | 4 | 5 | 6 | 7 | 8 |
|---|---|---|---|---|---|---|---|
| Vehicle Speed, Miles Per Hour | Scale Deflection Desired | | | Required Rate of Cutting Lines of Force | Required Flux Ratio through Induction Element | | |
| | Total | Lineal Component | Logarithmetic Component | | Total Lines | Air Path Only | Added by Yoke Effect |
| 0 | 0 | 0 | 0 | 0 | 1.45 | 1.00 | .45 |
| 2 | .34 | .34 | 0 | .290 | 1.45 | 1.0 | .45 |
| 4 | .68 | .68 | 0 | .580 | 1.45 | 1.0 | .45 |
| 6 | 1.02 | 1.02 | 0 | .870 | 1.45 | 1.0 | .45 |
| 8 | 1.36 | 1.36 | 0 | 1.160 | 1.45 | 1.0 | .45 |
| 10 | 1.70 | 1.70 | 0 | 1.45 | 1.45 | 1.0 | .45 |
| 12 | 2.49 | 1.70 | .79 | 2.13 | 1.77 | 1.0 | .77 |
| 14 | 3.16 | 1.70 | 1.46 | 2.70 | 1.93 | 1.0 | .93 |
| 16 | 3.74 | 1.70 | 2.04 | 3.20 | 2.00 | 1.0 | 1.00 |
| 18 | 4.25 | 1.70 | 2.55 | 3.64 | 2.02 | 1.0 | 1.02 |
| 20 | 4.71 | 1.70 | 3.01 | 4.02 | 2.01 | 1.0 | 1.01 |
| 22 | 5.12 | 1.70 | 3.42 | 4.37 | 1.99 | 1.0 | .99 |
| 24 | 5.50 | 1.70 | 3.80 | 4.70 | 1.96 | 1.0 | .96 |
| 26 | 5.85 | 1.70 | 4.15 | 5.00 | 1.92 | 1.0 | .92 |
| 28 | 6.17 | 1.70 | 4.47 | 5.26 | 1.88 | 1.0 | .88 |
| 30 | 6.47 | 1.70 | 4.77 | 5.53 | 1.84 | 1.0 | .84 |
| 40 | 7.72 | 1.70 | 6.02 | 6.60 | 1.65 | 1.0 | .65 |
| 50 | 8.69 | 1.70 | 6.99 | 7.43 | 1.49 | 1.0 | .49 |
| 60 | 9.48 | 1.70 | 7.78 | 8.10 | 1.35 | 1.0 | .35 |
| 70 | 10.15 | 1.70 | 8.45 | 8.68 | 1.24 | 1.0 | .24 |
| 80 | 10.73 | 1.70 | 9.03 | 9.18 | 1.15 | 1.0 | .15 |
| 90 | 11.24 | 1.70 | 9.54 | 9.63 | 1.07 | 1.0 | .07 |
| 100 | 11.70 | 1.70 | 10.0 | 10.0 | 1.00 | 1.0 | 0 |

It is presumed, in this typical computation, that it is desired to construct a speedometer which will have a scale reading from zero to 100 miles per hour, and that the scale graduations will be of uniform spacing from zero to 10 miles per hour and will be spaced logarithmically from 10 to 100 miles per hour. For convenience the various vehicle speeds selected for computation are set forth in column 1. Next, knowing the total length of the scale in inches or centimeters (which for present purposes is assumed to be 11.7 from zero to 100), the linear distances for the respective meter readings are computed in column 2. Since the scale is to be of a linear nature from zero to 10 column 3 represents a factor required to be subtracted from the distance set forth in column 1, in order to make the scale linear in the zero to 10 range. Column 4 therefore is the value obtained by subtracting the figures of column 3 from the corresponding figures of column 2. Column 5 shows the values denoting the required rate of cutting lines of force in order to deflect the pointer to the respective distances shown in column 2, that is, figures by laying out the total length of a scale upon a piece of cross section paper. The width, X, of the induction element is selected by trial and the area which is required to be in registry between the ear and the yoke at any given speed is known from the computation just completed. The height, H, is determined by counting the number of squares on the cross sectional paper in the registry area which will provide the desired area. Thus, contour 21 may be the shape of the bottom edge of a yoke which will display the desired deflection characteristics according to the computations just completed. The adjacent portion of the yoke is shown at 22 and the upper edge of the yoke in this example is assumed to be straight. It is to be observed that the contour is not symmetrical and does not appear to follow any algebraic expression, but this condition occurs because of the fact that the ear 8 is assumed to be of a substantial width, X, which at any given time will embrace a portion of the yoke having a varying contour. For purposes of illustration, in Figure 8 it is also assumed that the position of the induction element with respect to the scale is indicated by the pointer 23.

The scales shown in Figures 2 and 3 represent modified types of scales which may be accommodated by similar configurations of the yoke. The speedometer shown in Figure 4 comprises a scale 25 which is linear from zero to 10 and logarithmic from 10 to 100, and a second scale 26 which is shiftable with respect to the scale 25 by means of a declassification mechanism similar to that described in Patent No. 2,362,971. As declassification takes place scale 26 is moved through a connection 27, relatively to the left, whereby the safety speed, represented on scale 26, is less than the true speed indicated on scale 25, more or less depending upon the degree of declassification. All speeds in excess of 10 on the safety scale 26 are of a speed proportional to the speed on the true scale 25, the amount depending upon the displacement or declassification.

The scales shown in Figure 7 are shiftable with respect to each other as are those in Figure 4. In Figure 7 scale 15a, marked equivalent speed, is fixed to panel 16a and hence is stationary. Scale 15 being attached to yoke 9 is shiftable with respect to scale 15a. As declassification takes place yoke 9 moves about hub 10 carrying with it scale 15 and the complete working element of the speed responsive means. Regardless of its position, however, registration is true on scale 15. The indication on the outer scale varies according to the relative displacement of the inner and outer scales. If the instrument is not used for declassification as described in Patent No. 2,362,971 and limited to the providing of an arbitrary response characteristic, then hub 10 may be eliminated and yoke 9 may be structurally fastened to panel 16a.

Having described my invention, I claim:

1. A speedometer comprising an annular yoke of magnetic material, an induction member concentric with said yoke and arranged to move circumferentially adjacent to said yoke, and a bar-type magnet rotatable relative to said yoke during operation and arranged adjacent said induction member for deflecting the induction member, by inducement of eddy currents therein, from a starting position an amount depending upon the speed of rotation of said magnet and the magnitude of eddy currents developed in said induction member, said yoke being varyingly configurated to create a non-uniform angular magnetic field as the permanent magnet revolves, and said induction member having various areas of varying electrical resistance to the flow of eddy currents for registration with the magnetic field upon movement of said induction member to progressively different positions from said starting position.

2. A speedometer comprising a yoke member, a bar-type magnet, and an induction member, said induction member and magnet being relatively independently rotatable upon a common axis which is in substantial alignment with the axis of said yoke whereby said induction member is deflected from a given position by the inducement of eddy currents therein upon relative rotation of said magnet with respect to said yoke, said yoke member and said induction member each being varyingly configurated to respectively present progressively varying areas of registration of said yoke with areas of said induction member upon deflection of said induction member from a given starting position and thereby to vary the response of said induction member with respect to the speed of relative rotation between said magnet and said yoke.

3. A speedometer comprising a magnet, an induction member and a yoke, concentrically arranged on a common axis, said magnet and yoke being rotatable relative to one another, and said induction member being independently deflectable about said axis from a given position through magnetic influence exerted thereon upon relative rotation of said yoke and magnet, said yoke and said induction member each being configurated so as to present progressively different areas of magnetic influence to said induction member upon movement thereof to progressive positions from said given position.

4. A speedometer comprising a rotatable magnet, an induction element, a magnetically permeable yoke, and a needle connected to the induction element all arranged on a common axis whereby said induction element is deflected from a given position through magnetic induction upon rotation of said magnet, said yoke and said induction element each being of irregular configuration in respect to path of rotation of said rotatable magnet to cause predetermined variations in the rates of deflection of the needle which are proportionately different for predetermined variations in the rates of rotation of the magnet.

5. A speedometer comprising: a bar-type rotatable magnet, a magnetically responsive yoke concentrically surrounding the path of rotation of the magnet and a movable magnetically inducible member concentrically interposed between said yoke and the path of rotation of said magnet whereby said member is deflected from a given starting position through magnetic flux induced therein upon registry of said member with said magnet, said magnetically inducible member and said yoke each being varyingly configurated so as to present progressively different areas of registry to each other at different positions of deflection thereof as induced by rotation of said magnet.

6. A speedometer comprising; an annular yoke of magnetic material, an induction member arranged to move circumferentially adjacent said yoke, in concentric relation thereto, and a magnet rotatable relative to said yoke and arranged concentrically adjacent said induction member for deflecting the induction member by inducement of eddy currents therein, said yoke and said induction member each having a varied mass circumferentially relative to each other so as to present progressively different areas for registry with each other, thereby exposing said induction element to magnetic fields of varying maximum intensity and inducing varying magnitudes of eddy currents in various areas of the induction element as said induction member is deflected from a starting position.

7. A speedometer comprising; an annular yoke of magnetic material, an induction member arranged to move circumferentially adjacent said yoke, in concentric relation thereto, and a magnet rotatable relative to said yoke and arranged concentrically adjacent said induction member for deflecting the induction member by inducement of eddy currents therein, said yoke and said induction member each varying circumferentially in electrical characteristics relative to each other so as to present areas for registry with each other which are progressively different in electroinductive and resistance effects, thereby exposing said induction element to magnetic fields of varying maximum intensity and inducing varying magnitudes of eddy currents in various areas of the induction element as said induction member is deflected from a starting position.

8. A speedometer comprising; a fixed magnetically permeable yoke of progressively varying reluctance, a magnet rotatable relative to said yoke during operation of said speedometer, an indicator, a non-magnetic electrical conducting induction member of progressively varying electrical resistance to the flow of eddy currents connected to said indicator and adapted to move between said yoke and the path of rotation of said magnet upon induction of eddy currents therein, whereby said indicator is responsive to the relative speed of rotation of said magnet and to variation in magnetic drag created in said induction member in response to variation between the magnetic field strength established between the yoke and the magnet as it moves from position to position.

LESTER L. BOSCH.

REFERENCES CITED

The following references are of record in the file of this patent:

UNITED STATES PATENTS

| Number | Name | Date |
| --- | --- | --- |
| 1,067,463 | Cadman | July 15, 1913 |
| 1,202,777 | Beckmann | Oct. 31, 1916 |
| 1,568,040 | Berge | Jan. 5, 1926 |
| 1,759,933 | Bonell | May 27, 1930 |
| 1,782,588 | Terman | Nov. 25, 1930 |

FOREIGN PATENTS

| Number | Country | Date |
| --- | --- | --- |
| 570,625 | Germany | Feb. 18, 1933 |